Aug. 5, 1930.  C. G. CRONWALL  1,771,987
ADJUSTABLE SEAT STRUCTURE FOR AUTOMOBILES
Filed April 23, 1928  4 Sheets-Sheet 1
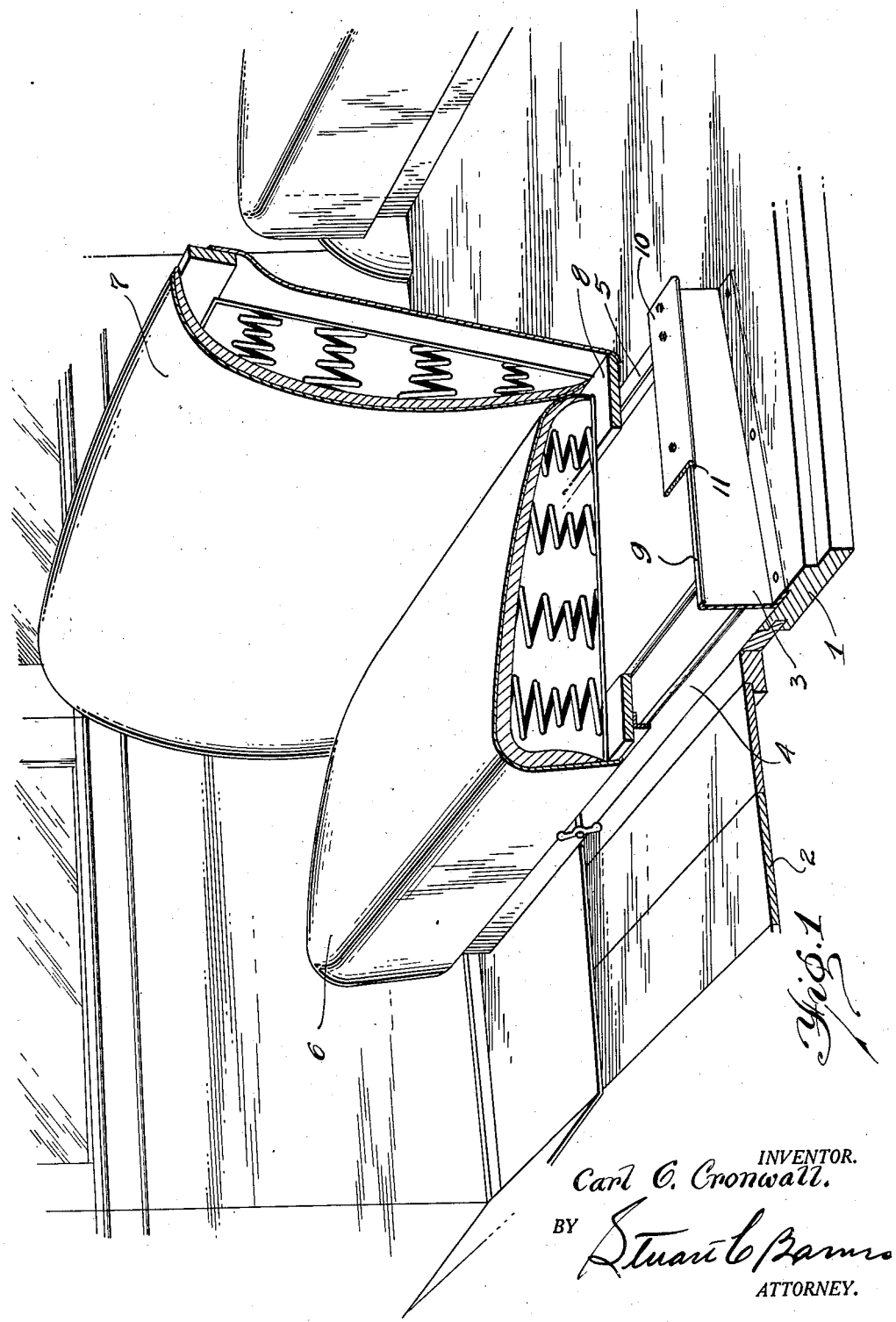
INVENTOR.
Carl C. Cronwall.
BY
ATTORNEY.

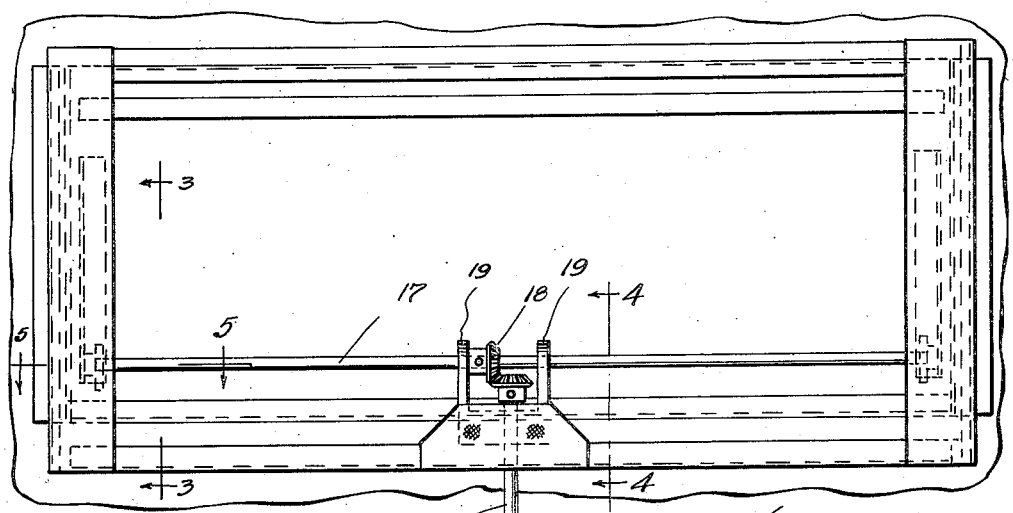

Aug. 5, 1930.  C. G. CRONWALL  1,771,987
ADJUSTABLE SEAT STRUCTURE FOR AUTOMOBILES
Filed April 23, 1928   4 Sheets-Sheet 4
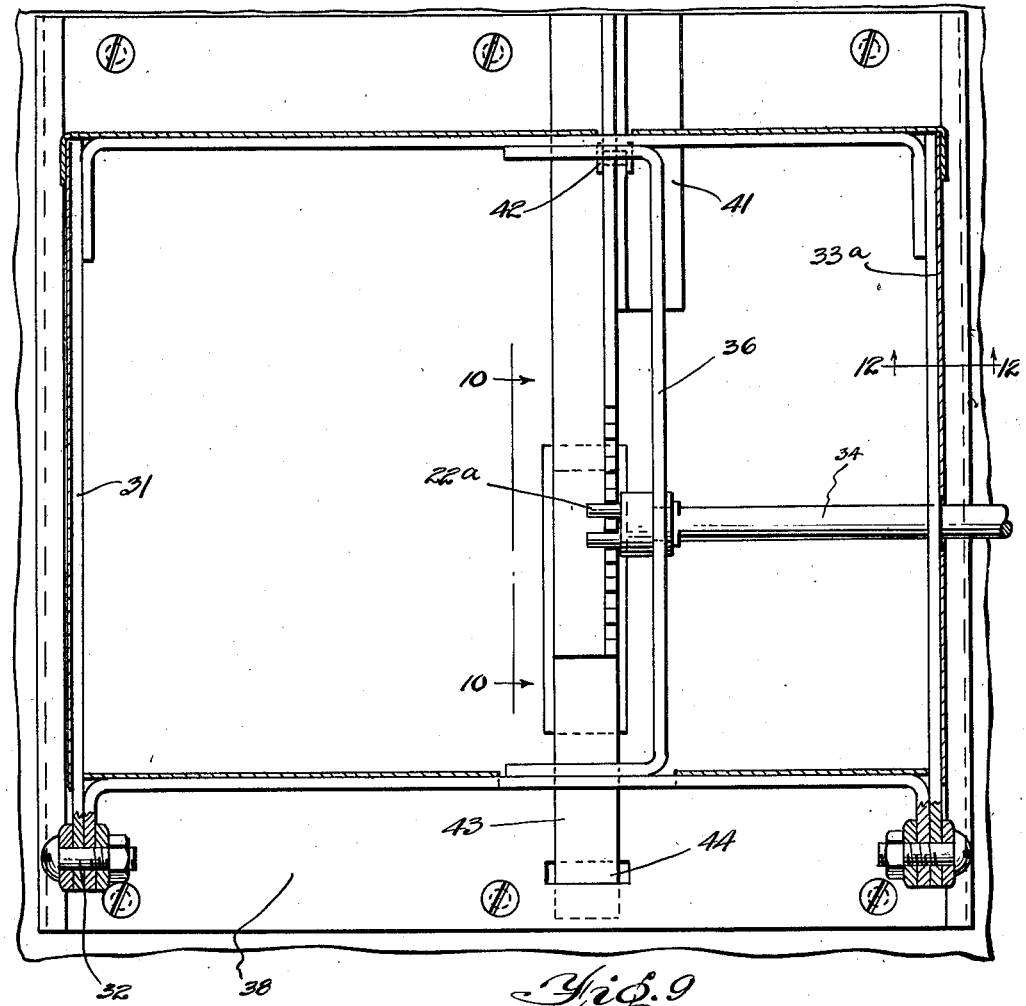
INVENTOR.
Carl C. Cronwall.
BY Stuart C. Barnes
ATTORNEY.

Patented Aug. 5, 1930

1,771,987

UNITED STATES PATENT OFFICE

CARL G. CRONWALL, OF DETROIT, MICHIGAN, ASSIGNOR TO GENERAL MOTORS CORPORATION, OF DETROIT, MICHIGAN, A CORPORATION OF DELAWARE

ADJUSTABLE SEAT STRUCTURE FOR AUTOMOBILES

Application filed April 23, 1928. Serial No. 271,997.

This invention relates to automobile seats, and has to do especially with the provision of an adjustable seat structure which is especially useful in a seat for a driver of an automobile.

The position of the driver's seat with respect to the steering wheel, foot pedals, gear shift lever, etc., of an automobile is all-important for a nicety of operation and for ease and a non-tiresome position for the driver; and it is obvious that the correct seat position for one individual may be entirely incorrect for others. It is appreciated that adjustable seats for this purpose have been heretofore proposed but the present invention aims to provide an improved adjustable mechanism which is calculated to meet the severe requirements of automobile use.

Accordingly, the invention contemplates a structure which includes a simple, rugged adjusting mechanism which will not be subject to looseness or rattling during the use of the automobile, and which requires a simple manual operation so that anyone can very quickly adjust the seat to meet that particular person's requirement. The adjusting mechanism is of such a structure as to automatically lock the seat in a positive manner in any position in which it may be placed, but which also permits quick adjustment of the seat by suitable manipulation of a manually operable part, without involving the necessity of releasing any locking mechanism.

In other words, while the mechanism locks the seat in any position, it is self-releasing when adjustment of the seat is made by operation of the operable part provided for the purpose. Thus the seat is positively locked in position at all times except when being adjusted so that there is no chance of the seat becoming loose or moving while the automobile is being operated, which would be particularly dangerous when driving at high speeds.

Moreover, the adjusting mechanism is such as to require a minimum amount of space which is important in the present day vogue of building automobiles low, and in some instances, of short wheel base. In reality, the mechanism can be embodied in space otherwise unoccupied without so much as offering any material interference with the tool compartment ordinarily located underneath the seat.

In the accompanying drawings:

Fig. 1 is a perspective view with parts cut away and parts in section, showing an interior of an automobile and illustrating the manner in which the adjustable seat is mounted.

Fig. 2 is a horizontal plan view of the seat mounting illustrating the operating parts of the adjustable mechanism.

Fig. 3 is a sectional view taken on line 3—3 of Fig. 2 showing the cooperating adjustable and locking parts.

Fig. 4 is a sectional view on line 4—4 of Fig. 2 illustrating the mounting of the operating shaft.

Fig. 5 is an enlarged section on line 5—5 of Fig. 2.

Fig. 6 is a view similar to Fig. 3 illustrating the limit of movement of the two relatively movable adjusting parts.

Fig. 9 is an enlarged sectional view taken on line 9—9 of Fig. 8.

Fig. 10 is a detail view looking substantially on line 10—10 of Fig. 9.

Fig. 11 is a view similar to Fig. 3 illustrating one position the parts assume during operation.

Fig. 12 is a section on line 12—12 of Fig. 9.

Figure 7:
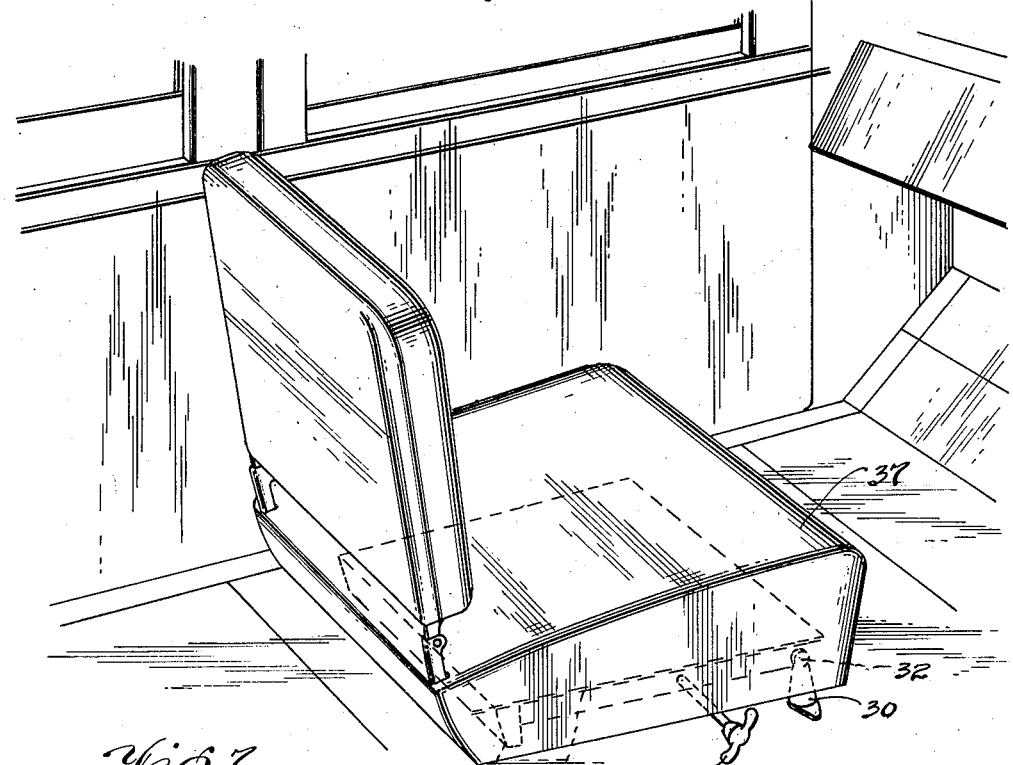
Fig. 7 is a perspective view of a different type of seat in which the invention can be embodied.

In the accompanying drawings Fig. 1 represents the interior of an automobile, the usual body sills being shown at 1, and the floor boards at 2. A seat supporting structure includes an end support 3, one being shown in the present instance, it being understood that there is a similar member on the opposite side of the car, and cross supports 4 and 5.

The seat itself includes a seat proper 6 and a seat back 7 which are carried on a suitable frame structure 8, which includes the several structureal members shown. This seat structure is movably mounted on the seat support, and for this purpose the members 3 may be angled over, as at 9, and plates 10 may be secured to the bottom of the seat frame with the edges of the plates turned over as at 11, thus forming a channel for the flange 9. It will readily be seen that by this construction the seat frame can be reciprocated forwardly and rearwardly of the car with the channel 11 and flange 9 slidably interfitting.

Referring to Fig. 2 it will be noted that the seat frame has journaled therein an operating shaft 15 provided with a suitable handle 16 and operably associated with a second rotatable shaft 17. For the purpose of operably associating the two shafts a pair of intermeshing pinions may advantageously be used.

The shaft 17 extends crosswise of the automobile body and is journaled in the lugs 19 carried by the automobile seat frame, and is also journaled near its ends in bracket-like members 20 secured to the seat frame. The ends of the shaft 17 are provided with means for engagement with devices carried by the seat support. This means consists of a pair of pins positioned opposite each other and positioned eccentrically of the shaft. Each end of the shaft may advantageously be provided with an enlargement in the nature of a disk 21 for the purpose of carrying the pins, the same being referenced 22.

It will be noted that the brackets 20 have an inverted U-shaped recess 20$^a$ for receiving the ends of the shaft, and that the brackets 19 have a bayonet type slot 19$^a$. This construction facilitates the assembly of the mechanism; for example, the disks 21 at the ends of the shaft may be integral with the shaft, and the shaft can be inserted through the bayonet slots 19$^a$ and into the inverted U-slots 20$^a$ whereupon the brackets 19 may be welded or otherwise secured to the seat frame.

These eccentrically mounted pins cooperate with rack devices on the seat support. As shown in Fig. 3, a rack 23 is pivoted to the seat support 3, as at 24. The pins 22 fit in the teeth of the rack while the rack is held upwardly into tight engagement with the pins by means of a spring 25. Noting Fig. 5, it will be observed that the rack is in the nature of an angle member having a leg 23$^a$ which overlies the spring and with which the spring makes contact. For the purpose of mounting the spring, an angular plate 26 is secured to the side support 2 by means of spot welding, as shown at 27. The spring 25 may have one end inserted through an opening 28 in this angular support and be held in proper alignment by means of an upturned lip 29.

It will thus be observed that the shaft 17 is journaled in the seat frame and the racks are pivoted to the seat support and springpressed so that they are urged into engagement with the pins at the ends of the shaft.

In making an adjustment of the seat, the handle 16 is rotated thus effecting rotation of the shaft 17. When the shaft 17 has made a quarter turn the parts are substantially in the position shown in Fig. 11 with one pin raised from the rack and with the other pin engaging between the two teeth of the rack. At this time the rack is pressed downwardly and the spring is flexed; when the shaft 17 has made a full one-half revolution the pins are again in alignment, as shown in Fig. 3. Thus the seat structure has been advanced one notch of the rack.

It will be noted that in the normal position of the parts, as shown in Fig. 3, that the pins 22 are in alignment, which alignment is coincident with the pitch of the rack. Accordingly, the seat is positively locked in position inasmuch as any force which tends to move the seat forwardly or rearwardly does not create any turning moment on the shaft 17; but this force is positively met with and overcome by the two aligned pins in the teeth of the rack.

The limit of forward movement of the seat is effected by reason of one pin moving over the end of the rack, as shown in Fig. 6. If further rotation of the shaft 17 is attempted, the pin, which is over the end of the rack, moves downwardly inasmuch as it does not come into contact with the bottom of a furrow between two teeth, so that the final or end tooth is locked between the two pins, and the one pin remaining in the end furrow can not be removed therefrom.

In Fig. 7 there is illustrated a foldable seat for accommodating a single passenger, seats of this type being used largely in body types termed "two door sedans" wherein one or both front seats are foldable and the occupants of the rear seat must move past the foldable seats in order to get in and out of the car. A seat supporting post is shown at 30 to which a seat supporting frame 31 is pivoted, as at 32, the frame having at its rear end a support 33. The rear support is secured to a metal boxing or casing 33$^a$ within which the frame 31 seats. Journaled in this frame is a shaft 34 provided with an operating handle 35, and preferably the frame includes a cross support 36 in which the shaft is journaled. This shaft carries two eccentrically arranged pins 22$^a$. The seat per se is referenced 37, and it is mounted upon a plate 38, which is slidable on the support by a tongue and groove connection 39. (Fig. 12.)

Figure 8:
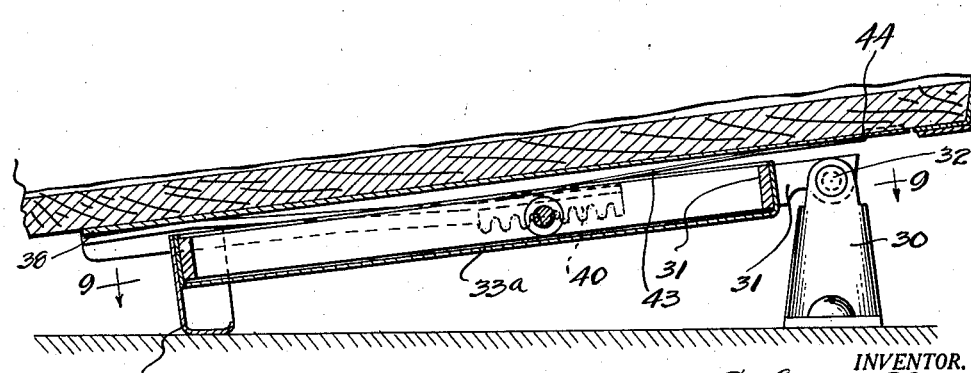
Fig. 8 is an enlarged sectional view taken through this seat.

A rack 40 is advantageously constructed of a member angular in cross section and pivotally mounted on the plate 38. For this purpose an angle bracket 41 is secured to the underneath side of the plate with the rack pivoted thereto by a suitable bolt or rivet 42. A flat leaf spring 43 is also secured to the plate 38 as by means of a bend in the spring disposed through an aperture in the plate, as shown at 44 (Figs. 8 and 9). As shown at Fig. 8 the free end of this spring engages the rack member and urges the same into contact with the pins 22ª.

The invention as applied to the single foldable seat, may advantageously have the operating shaft journaled in fixed position, and it will be seen by reference to Fig. 8, that the turning of this shaft effects advancing or retracting of the rack; the seat, being attached to the rack, is accordingly advanced or retracted. During this movement the rack reciprocates and the spring flexes during such reciprocation in a manner which is the same as that previously described with respect to the full seat. In the full cross seat construction the operating shaft, which includes the pins, is the moving member, with the racks stationary, whereas in the single seat form the arrangement is just the reverse. Due to the difference in structure of the two seats such arrangements have been found advantageous.

The manner in which this adjustable mechanism effects positive locking of the seat when in adjusted position, and at the same time provides for adjustment of the seat by the mere operation of the handle provided for the purpose, is again emphasized. No operations or care on the part of the person making adjustments are necessary for locking the seat in position because the mechanism is self-locking. On the other hand, the mechanism is self-releasing for adjustment purposes when the operating handle is actuated.

Claims:

1. An adjustable automobile seat structure comprising in combination, a seat support, a seat slidably carried by the support, a rack member, a rotatable member having a pair of eccentric pins for engagement with the rack, one of these members being mounted on the seat and the other on the seat support, means for actuating the rotatable member whereby the pins engaging the rack effect relative movement between the two parts to adjust the seat, said eccentric pins being positioned so that both may engage the rack on a dead center line to lock the seat in adjusted position said rack member and rotatable member being mounted for relative movement toward and away from each other to accommodate for the eccentricity of the pins.

2. An adjustable automobile seat structure comprising in combination, a seat support, a seat slidably carried by the support, a rack member, a rotatable member having a pair of eccentric pins for engagement with the rack, one of these members being mounted on the seat and the other on the seat support, means for actuating the rotatable member whereby the pins enaging the rack effect longitudinal movement of the rack relative to the rotatable member to adjust the seat, said eccentric pins being positioned so that both may engage the rack on a dead center line to lock the seat in adjusted position, and spring means for urging the rack and pins into engagement with each other, said spring means yielding to permit movement of the rack and rotatable member toward and away from each other upon the rotation of the rotatable member.

3. An adjustable automobile seat structure comprising in combination, a seat support, a seat slidably carried by the support, a rack member, a rotatable member having a pair of eccentric pins for engagement with the rack, one of these members being mounted on the seat and the other on the seat support, means for actuating the rotatable member whereby the pins engaging the rack effect relative movement between the two parts to adjust the seat, said eccentric pins being positioned so that both may engage the rack on a dead center line to lock the seat in adjusted position, and spring means urging the rack into tight engagement with the pins, which spring means yields under the action of the eccentric pins as the rotatable adjusting member is rotated.

In testimony whereof I affix my signature.

CARL G. CRONWALL.